G. Smith,
Pipe Wrench.
Nº 26,530.      Patented Dec. 20, 1859.
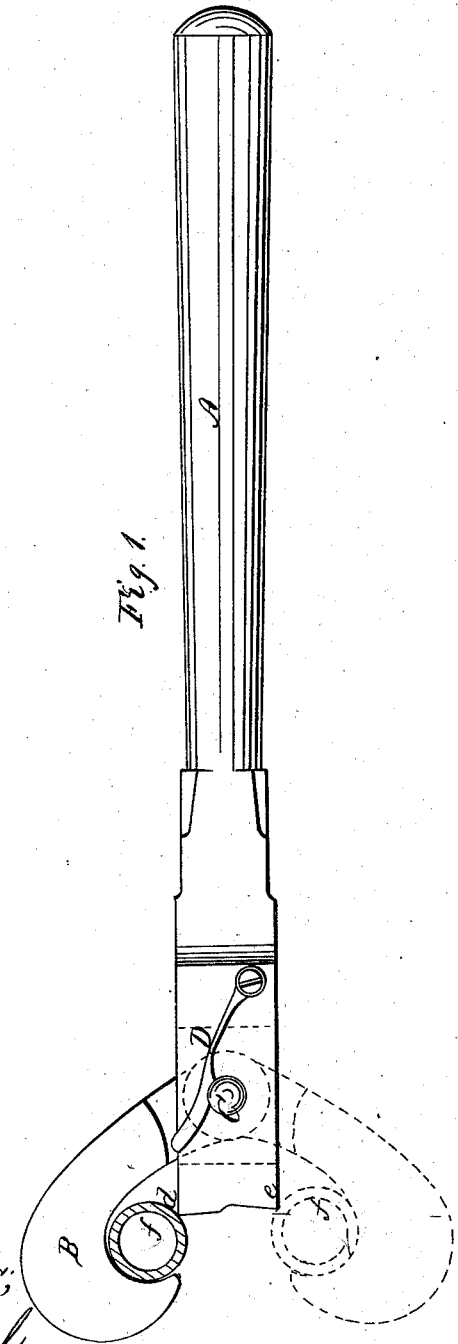
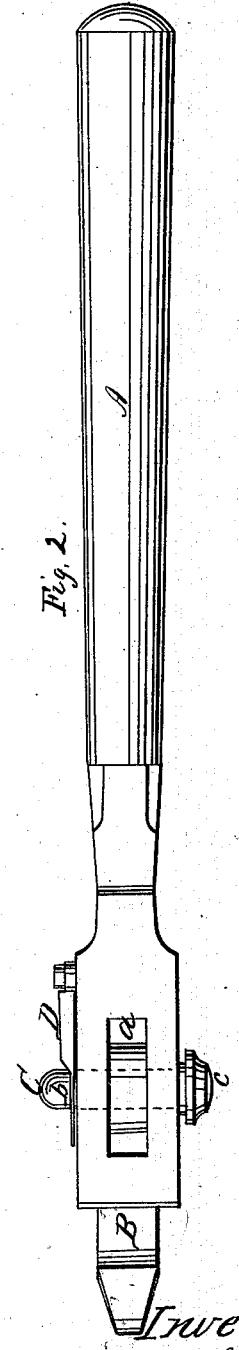
Witnesses:
W. Tusch
W. Nauff
Inventor,
George Smith

UNITED STATES PATENT OFFICE.

GEORGE SMITH, OF NEW YORK, N. Y.

PIPE-NIPPERS.

Specification of Letters Patent No. 26,530, dated December 20, 1859.

*To all whom it may concern:*

Be it known that I, GEORGE SMITH, of the city, county, and State of New York, have invented a new and useful Improvement in Nippers for Grasping and Turning Cylindrical Articles, such as Pipes, Tubing, and the Like; and I do hereby declare that the following is a full, clear, and exact description of the same, reference being had to the annexed drawings, making a part of this specification, in which—

Figure 1 is a side view of my invention. Fig. 2 is an edge view of the same.

Similar letters of reference indicate corresponding parts in the two figures.

To enable those skilled in the art to fully understand and construct my invention I will proceed to describe it.

A, represents a bar or lever which is of metal and made of any suitable length according to the desired size of the implement. The outer part of this bar or lever may be made round or cylindrical to serve as a handle, and the inner part is of quadrilateral form and has an oblong slot $a$, made through it, as shown clearly in Fig. 2. Within this slot $a$, the inner end of a hook or claw B, is secured by a pin C, said pin passing transversely through the bar or lever and inner end of the hook or claw and secured in proper position by a spring catch D, which is attached to one side of the bar or lever and fits in a groove $b$, made circumferentially in the pin near one end, the opposite end being provided with a head $c$, as shown clearly in Fig. 2.

The hook or claw B, may be of steel and of the form shown clearly in Fig. 1, and the inner end of the bar or lever is also of steel tempered quite hard and recessed or formed in such a way that one side $d$, will be a trifle longer or project out farther than the other $e$, as shown clearly in Fig. 1. Each edge or side $d$, $e$, at the end of the bar or lever forms a straight bearing edge and sufficiently angular to retain or hold the work when the latter is pressed against it.

The implement is used as follows: The handle A, is grasped by the operator and the implement adjusted to its work so that the pipe, tube or other article $f$, to be grasped and operated upon will be between the hook or claw and either of the edges $d$, or $e$, the handle A, is then turned in the direction that will force the edge $d$, or $e$, into the article $f$, and draw or bind the hook or claw upon it. It will be seen at once by referring to Fig. 1, that the greater the resistance offered by the article to the power applied by the implement the stronger the hook or claw B', and edge $d$, or $e$, of the bar will grasp the work and all slipping of the tool or implement prevented and the article therefore may be readily turned as the operator can apply his whole strength to the turning of the article, no effort being required to hold the tool to its work. By reversing the position of the hook or claw B, as shown in red outline Fig. 1, two articles of different diameters may be grasped by it, the difference in diameter being equal to the difference in the length of the ends $d$, $e$, of the bar or lever A. Each tool or implement is to be provided with a number of hooks or claws so that the implement may be applied to articles of various sizes. The manner as shown of securing the hooks or claws in the bar or lever, to wit, by means of pin C, and spring catch D, admitting of the facile adjustment of the hooks or claws to the bar or lever.

I do not claim broadly the employment or use of a hook or claw attached to a bar or lever irrespective of the arrangement herein shown and described, but having thus described my invention What I do claim as new and desire to secure by Letters Patent, is, The combination with the slotted lever A, of the movable claw B, grooved pin C, and holding spring D, as herein shown and described, so that the claw may be readily removed from one side of the lever to the other, thus forming a right or left handed instrument, at pleasure all as set forth.

GEORGE SMITH.

Witnesses:
WM. TUSCH,
W. HANFT.